United States Patent [19]

Munger

[11] 3,792,606

[45] Feb. 19, 1974

[54] METHOD AND APPARATUS FOR ENHANCING DETECTION OF SMALL LEAKS IN ARTICLES

[75] Inventor: Donald W. Munger, New Milford, Conn.

[73] Assignee: American Can Company, Greenwich, Conn.

[22] Filed: Apr. 17, 1972

[21] Appl. No.: 244,807

[52] U.S. Cl. .................................. 73/40, 73/45.1
[51] Int. Cl. .............................................. G01m 3/24
[58] Field of Search ... 73/40, 40.5 A, 45, 45.1, 45.2

[56] References Cited
UNITED STATES PATENTS
3,266,296  8/1966  Hall ........................................ 73/40
3,399,563  9/1968  Helms ................................. 73/40 R Primary Examiner—Richard C. Queisser
Assistant Examiner—Joseph W. Roskos
Attorney, Agent, or Firm—Roland T. Bryan

[57] ABSTRACT

In testing apparatus used for high speed production line leak testing of container ends, bodies and the like, and of the type comprising means for applying pressurized fluid such as air to a surface of the article to be tested and detecting means such as a microphone positioned adjacent the article to respond to high frequency sound vibrations caused by passage of the pressurized fluid through leakage openings, there is provided an improved sound augmentation means and method capable of enhancing the detectibility of leakage openings in the tested articles. The sound augmentation means comprises a fine mesh screen or grid positioned out of contact with the article but closely adjacent and uniformly spaced from the surface thereof for intercepting the passage of the pressurized fluid through any leakage openings in the article. At least some of the energy of said leaking pressurized fluid is converted to a form to which said detecting means responds, thereby augmenting the detection of leakage vibrations by the detecting means. To detect leakage openings in typical applications, the screen is spaced from the surface of the article to be tested by a distance of e.g., about one-sixteenth to one-eighth inches, and the screen is of fine mesh, e.g., 120 mesh screen made with stainless steel wire of 0.003 to 0.007 inches diameter.

12 Claims, 3 Drawing Figures

METHOD AND APPARATUS FOR ENHANCING DETECTION OF SMALL LEAKS IN ARTICLES

BACKGROUND OF THE INVENTION

1. Field of the Invention

The field of the present invention relates to methods and apparatus used in testing articles such as container lids or bodies for leakage, and has particular application to the testing of easy opening can ends such as those having tear tabs or strips which, upon pulling, separate along predetermined tear lines to provide an opening or to remove the end from the can body. Such tear tabs are found, for example, in metal beer cans, and the tear strips are found in coffee or orange juice cans.

Such tabs or strips are formed by scoring or otherwise weakening the metal along predetermined tear lines, and little margin for error is available in obtaining just the right amount of weakening to make it easy to open the cans without at the same time creating minute holes or microleaks through which fluid pressure may be slowly lost or through which bacteria can enter.

Because the proper degree of scoring or weakening lies very close to the point where leak problems are created, it is desirable to test the can ends for pressure tightness and for leakage before they are incorporated in a can. In order to cope with the high rate of production of the can ends, it is necessary to test them very rapidly in a production line, automatically, and with only a very short time available for each test.

2. Description of the Prior Art

Leakage testing in the prior art has taken several different approaches. In one system, a chamber at one side of the article is pressurized, and a pressure drop in the chamber caused by fluid passing through a leak provides an indication that the leak is present. This system, however, is suitable only for indicating leaks of substantial size, because an unduly long time period is consumed in producing a detectable pressure displacement where microleaks are present. Because of this slow response, such systems have been unable to test for microleakage.

Another system, disclosed in U.S. Pat. No. 3,399,563 to Helms, is specifically directed to the problem of detecting microleaks and operates by sensing the leakage vibrations generated as pressurized fluid passes through a leak in the article. Because the leaks may be small, and only a small quantity of fluid passes through them to generate faint vibrations, Helms improves detection sensitivity by augmenting the vibrations to make them more easily detectible. Such augmentation is provided by depositing a film of moisture on a surface of the article to be tested just before pressure is applied thereto; leakage through the film of moisture produces vibrations which are enhanced or augmented and therefore more easily detected.

The moisture film method of enhancing or augmenting leakage vibrations is very effective, but as the rate of testing increases, problems arise in supplying an adequate quantity of fluid and in uniformly applying it to the tested articles, and similar problems arise in connection with rapidly evaporating the liquid from the articles by the time the test cycle is completed. In addition, problems are presented by the need to have the liquid chemically compatible with the article to be tested and to be fully evaporatable without leaving a residue which, for example, might alter the taste of a food product. Furthermore, experience has shown that with commonly used fluids such as alcohol, the moisture film method of augmenting leakage vibrations is best for a certain range of leakage openings, and less effective for larger leakage openings.

SUMMARY OF THE INVENTION

Objects of the present invention are to provide an augmentation means and method for enhancing the detectibility of leakage vibrations caused by passage of pressurized fluid through a leak in an article, which presents no problems of chemical compatibility and residue formation, which is capable of very rapid testing, and which is also capable of effectively improving detection of leaks by augmenting leakage vibrations.

According to the invention, an improved sound augmentation means is provided in a test apparatus arranged to determine leak tightness of articles such as container ends, bodies and the like, and adapted to be used in a production line enabling the individual testing of each and every article by providing a quick determination of whether any article has a leakage opening, said apparatus comprising means for applying pressurized fluid to a surface of the article to be tested and high frequency vibration sensitive detecting means positioned to be responsive to high frequency vibrations in the fluid near to the article. The sound augmentation means is positioned out of contact with the article but closely adjacent to the surface thereof, e.g. one-sixteenth to one-eighth inches from the surface, for intercepting the passage of said pressurized fluid through any leakage openings in the article and for converting at least a portion of the energy of the leaking pressurized fluid into vibrations to which the detecting means is responsive, thereby augmenting the detection of leakage vibrations by the detecting means. The sound augmentation means is preferably a finely perforated sheet member such as a screen or grid positioned substantially uniformly from the article's surface and with many small openings such as those provided by 120 mesh screen made of 0.003 to 0.007 inch diameter stainless steel wire. It is believed that the screen causes the leakage flow to become turbulent, which improves its detectability.

In another aspect, the sound augmentation means forms a part of test apparatus for determining the leak tightness of articles such as container ends, bodies and the like which comprises: walls forming a chamber, said chamber adapted to be hermetically sealed and having a test opening therein; means for sealingly clamping an article to be tested in a position covering said test opening of said chamber, said article having one surface bounding said chamber and the opposite surface thereof on the exterior of said chamber; pressure means for applying a predetermined differential fluid pressure across said exterior surface of said article to be tested; high frequency vibration sensitive detecting means sensitive to frequencies above 20,000 cycles per second and within said chamber for detecting any high frequency vibrations which are produced by the passage of said pressurized fluid through any leaks in the article to be tested; and said sound augmentation means positioned out of contact with but closely adjacent to said one article surface within said chamber and between said one article surface and said detecting means for intercepting the passage of pressurized fluid through any leakage openings in the article for augmenting the detection of leakage vibrations by said detecting means.

In still another aspect, the invention entails a method for determining the leak tightness of successive container ends, bodies and the like, which comprises: applying a predetermined differential fluid pressure across a surface of said article to be tested; positioning a sheet of sound augmentation material out of contact with but closely adjacent to said article's surface to intercept the passage of said pressurized fluid through any leakage openings in the article and to convert at least a portion of the energy of said pressurized fluid to high frequency vibrations; and detecting high frequency vibrations produced by the passage of said fluid through any leakage openings in the article being tested for determining the leak tightness thereof.

These and other objects and novel aspects of the invention will be apparent from the following description of a preferred embodiment.

DESCRIPTION OF THE PREFERRED EMBODIMENTS

Figure 1:
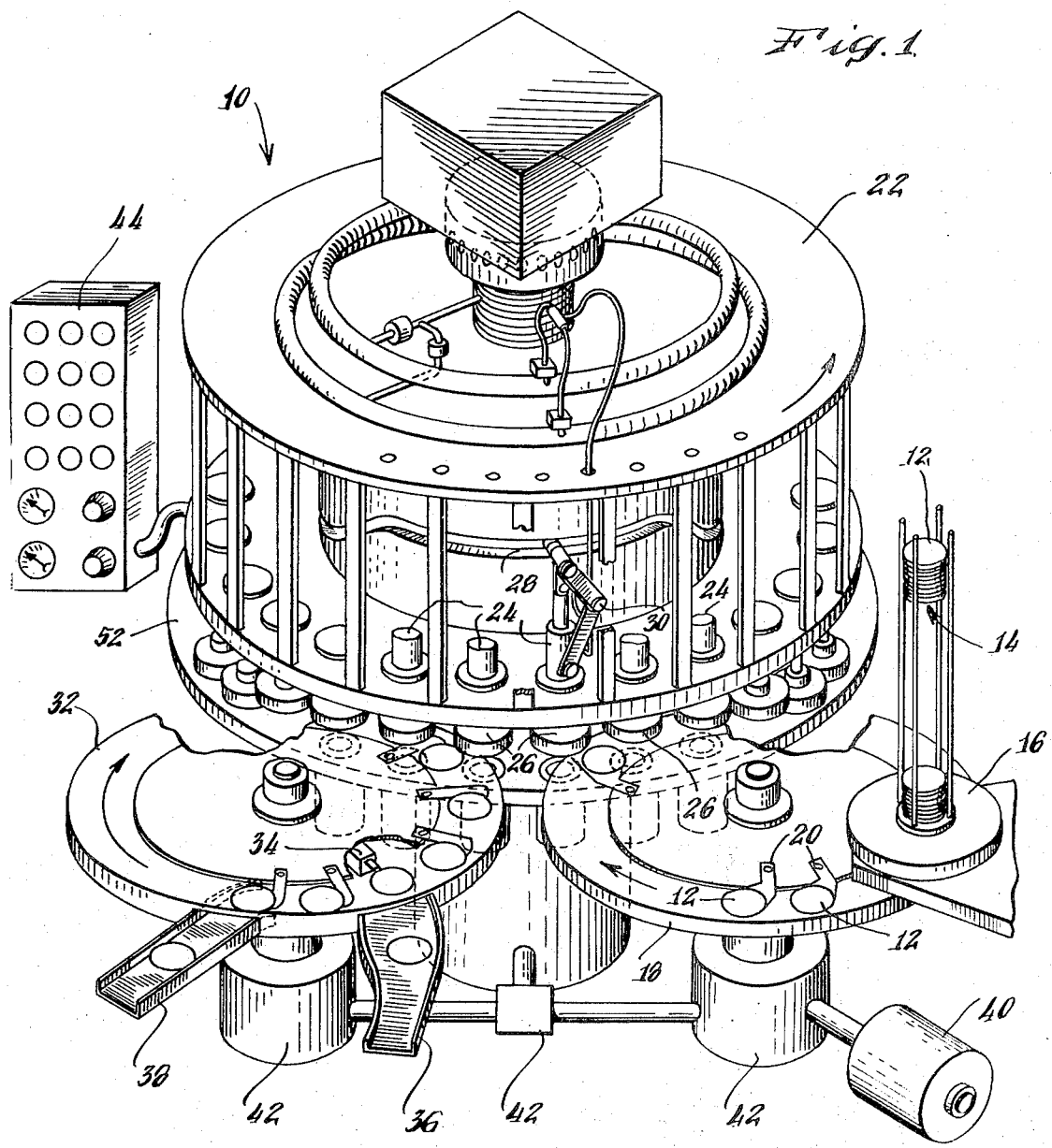
FIG. 1 is a simplified perspective view of a multistation test apparatus utilizing the present invention.

FIG. 1 illustrates a multi-station testing apparatus 10 designed for high speed, production line leakage testing of articles such as can ends 12, such high speed apparatus being of the type especially suited for and benefitting from use of the sound augmentation means of the present invention. Testing apparatus 10 receives can lids 12 from a vertical stack 14, and feeds them by means of an article feeder 16 (disclosed in copending U. S. Pat. application, Ser. No. 59,245, filed July 29, 1970, incorporated by reference) to a rotating infeed turret 18. Infeed turret 18 has uniformly spaced peripheral arms 20 which engage the can ends 12 and carry them to a synchronously rotating testing turret 22 to which the can ends 12 are transferred for testing in one of the plurality of testing stations 24 arranged around the outer periphery of testing turret 22. After an article 12 is deposited in a testing station 24, the article is sealed in the station by the station cover 26 as it is descended by the contour of stationary camming groove 28 operating through toggle linkage 30.

During rotation of testing turret 22, the testing stations 24 apply pressure to one surface of the article 12 and listen for sounds which reveal the presence of a leak hold in the article. After testing, the article is transferred to an outfeed turret 32 which includes a reject mechanism 34 to expel into a reject chute 36 those articles shown by the test to contain leaks. Satisfactory articles are delivered to another chute 38 which carries the articles to a stacking mechanism or to subsequent production line machinery.

The infeed turret 18, testing turret 22, and outfeed turret 32 are rotated in synchronism by a common drive motor 40 operating through various couplings 42. A control and indicating mechanism 44 monitors the apparatus 10. Typically, the speed of rotation is such that upwards of 600 can ends are to be tested per minute, which allows approximately 900 milliseconds for testing of each article in the depicted apparatus 10, which has 24 testing stations.

Figure 2:
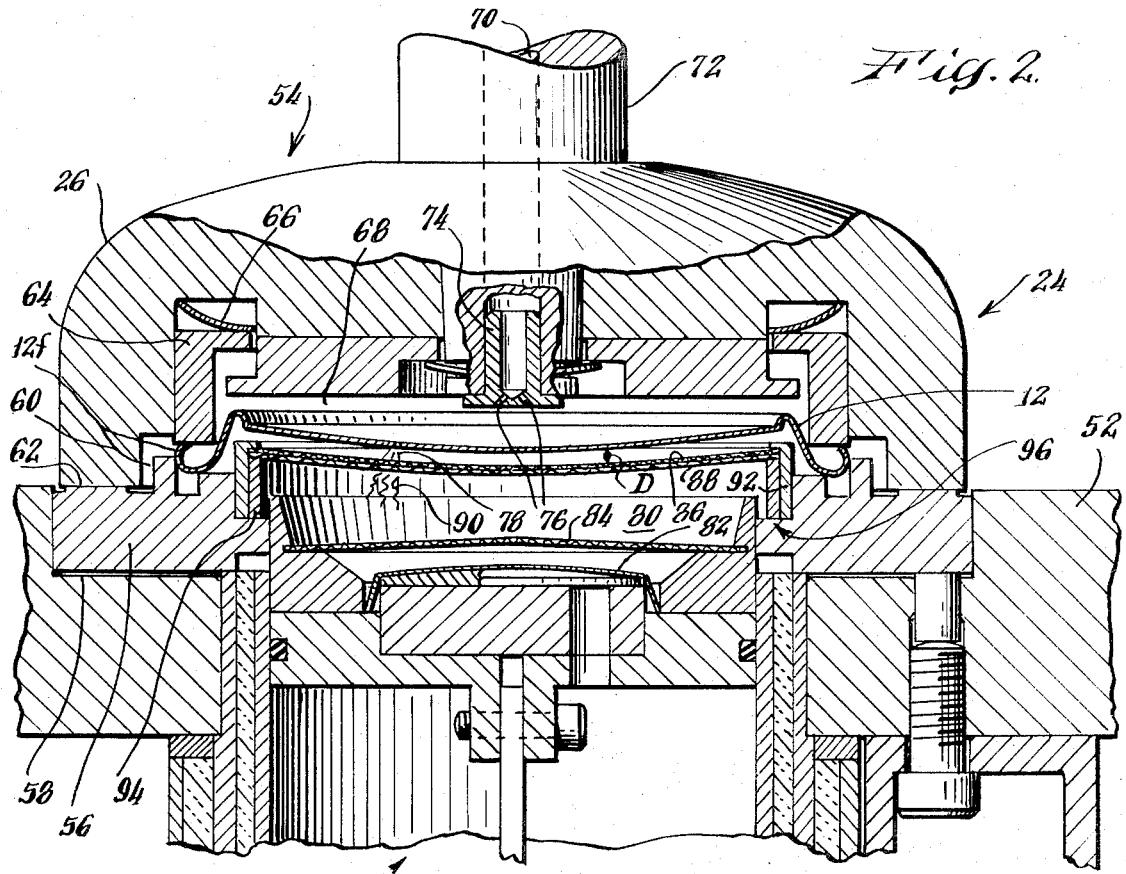
FIG. 2 is a sectional elevational view of a single testing unit of the apparatus of FIG. 1, showing the article in a sealed position during testing.
Figure 3:
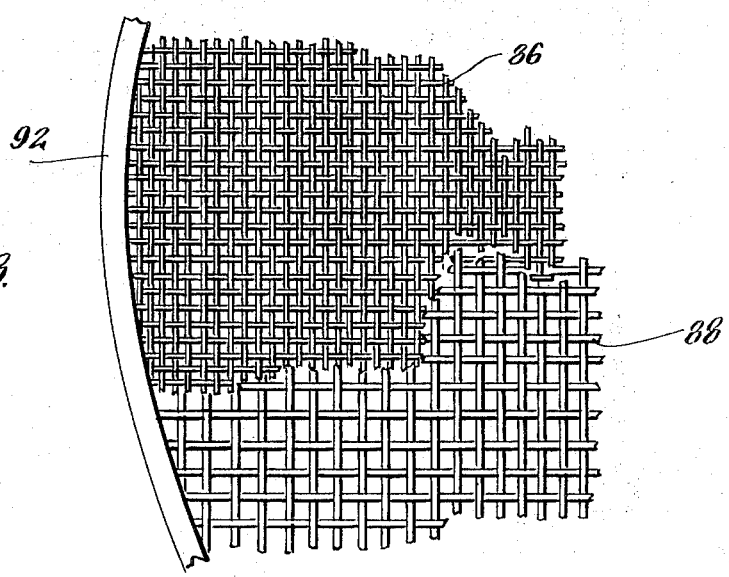
FIG. 3 is a partial plan view, with portions broken away, of the sound augmentation means according to the invention.

FIG. 2 illustrates a single testing station 24 with an article 12 positioned therein for testing. As shown, each testing station 24 comprises a fixed lower portion 50 mounted to platform 52 of testing turret 22 (FIG. 1) and an upper movable portion 54, including the station cover 26, which is lowered into engagement with the lower fixed portion 50 to clamp article 12 therebetween. The fixed portion 50 includes a rubber gasket 56 secured to turret platform 52 by adhesive tape gasket holder 58. Gasket 56 includes an upstanding annular flange 60 used for positioning article 12, a raised outer land 62 against which the station cover 26 seats to form a pressure seal, and an inner annular flange 63 against which the article 12 seats to form a seal with gasket 56. Article 12 is pushed against flange 63 by a pressure ring 64 slideably mounted in station cover 26 and resiliently urged by spring 66 against the outer rim 12f of article 12.

Testing station 24 therefore provides a sealed chamber 68 on the upper side of article 12. Into chamber 68, compressed air is introduced through a central passageway 70 provided in the shaft 72 which carries station cover 26, the air passing into chamber 68 through a diffuser plug 74 having outwardly directed air passages 76.

Pressurized fluid in chamber 68 will cause gas streams such as the stream illustrated at 78 to emanate from a leak hole in article 12 and flow into a sealed listening chamber 80 on the lower side of article 12. In listening chamber 80, there is situated a wide bandwidth, high frequency microphone in the form of a capacitor diaphragm 82. The fragile diaphragm 82 is protected from contact or harm from above by means of a coarse screen 84 mounted thereover.

It is intended that diaphragm 82 detect air vibrations caused by the gas stream 78 emanating from any leak hole in article 12. However, when the leaks are small, the vibrations which are produced by the leakage may not be strong enough to actuate diaphragm 82, or may not be strong enough to be distinguished from background noise which may be present. To enhance the detection of leaks, the present invention provides a sound augmentation means which converts the energy of leaking pressurized fluid to a form to which diaphragm 82 responds, and which is positioned out of contact with but closely adjacent to the entire surface of article 12 which is to be tested for leaks. The sound augmenting means is shown as a screen 86 of very fine mesh. The screen 86 is typically not very rigid, and thus it is supported by a coarser screen 88 which lies thereunder.

As shown in FIG. 2, sound augmentation screen 86 is held in an approximately spherical shape matching the shape of can lid 12 by means of outer retention rings 92, 94 which are threaded together to secure screens 86 and 88 therebetween, and which are mounted on a shoulder 96 provided on gasket 56.

Gas stream 78 emanating from a leak hole impinges upon the sound augmentation screen 86, which causes a turbulent vortex 90 to be produced. The screen by intercepting the passage of pressurized fluid through a leak hole and causing turbulence, thus converts the energy of the escaping fluid to a form which can be more easily detected by diaphragm 82. It is believed that, at least in part, laminar flow is converted to turbulent flow with consequently much greater acoustic energy detectable by diaphragm 82.

The sound augmentation screen 86 is sensitive to some degree both to its spacing from article 12 and to its fineness of mesh. As illustrated, sound augmentation screen 86 is uniformly spaced from the surface of article 12 by a distance D. Through experimentation, it has been learned that variation in the distance D produces a corresponding variation in the range of frequencies of sound produced in the turbulent stream 90. The smaller the distance D, the higher is the range of frequencies produced. A number of factors, however, may bear upon the choice of distance D. One such factor is the bandwidth of detection provided by microphone diaphragm 82 and its following circuitry. It is clear that the sound augmentation screen 86 must be placed so that the range of augmented frequencies produced by leakage matches the range of frequencies which can be detected. Another factor is the presence of surface irregularities on the lids due to embossed letters and the like, which irregularities prevent close spacing. When there are no competing considerations, it is believed preferable that the distance D be approximately one-sixteenth inch, which seems to optimize performance and enhancement of detection for leaks of various kinds and sizes such as are produced in tear tab can ends. Other distances D in the range from about 0 to one-fourth inches provide augmentation which enhances detection of typical leaks in can ends, and greater distances D may be suitable under some circumstances.

Sound augmentation screen 86 can be used alone, or it can be used in conjunction with other sound augmentation means, such as the one previously referred to and disclosed in Helms U. S. Pat. No. 3,399,563, which deposits a film of moisture on the surface of the article just before pressure is applied in Chamber 68. The Helms moisturization method of augmentation appears to be most successful for very small leaks, on the order of microinches. The sound augmentation screen 86, on the other hand, appears to provide greatest enhancement for slightly larger sized leaks. When the leaks are larger still, no enhancement is needed at all. Therefore, it is possible in a single device to match all these detecting schemes to provide enhanced detection over the complete range of leaks encountered. Referring to FIG. 2, it is contemplated that the film of moisture would be applied to article 12 before it is seated in testing station 24. Pressure would then be applied in chamber 68, and any leakage would have its sound enhanced either by the mositurization or by screen 86. When this composite detection scheme is used, it is found that to detect the moisturized sound, it is preferable to use a detector whose bandwidth extends from approximately 20 to 60 kilohertz, which corresponds to a screen spacing distance D of approximately three-thirtiseconds inches.

The mesh in sound augmentation screen 86 should be relatively fine in order to provide assurance that the fluid stream 78 from even a very small leak will be intercepted by the screen 86 to induce turbulence. Naturally, if the mesh openings are too large, it would be possible for a fluid stream 78 to substantially miss any of the wires constituting the screen. At the same time, however, the screen cannot be so dense as to effectively block the passage of the pressurized stream 78 and thereby detract from the creation and passage of turbulent flow. A screen mesh which has proved to be very effective is one which is 120 wires to the inch, each wire being approximately 0.003 to 0.007 inches in diameter. With these parameters, the screen area is approximately half open and half closed by the screen wires.

In addition to screens, i.e., interleaved wires forming a mesh, it should be apparent that the sound augmentation means 86 can be formed also from other structures which uniformly provide openings therein and cause turbulence upon flow of a pressurized leakage stream 78 thereupon. For example, perforated sheet material will produce such enhancement, as will non-woven materials such as stainless steel wool in appropriate thicknesses. Other examples of screen substitutes will be apparent.

It should be understood that the foregoing description is for the purpose of illustration and that the invention inclues all modifications and equivalents which fall within the scope of the appended claims.

What is claimed is:

1. In a test apparatus for determining leak tightness of articles such as container ends, bodies and the like and adapted to be used in a production line for enabling the testing of each and every article by providing a quick determination of any of the articles having microleakage openings, said apparatus comprising means for applying pressurized fluid to a surface of the article to be tested and high frequency vibration sensitive detecting means positioned to be responsive to high frequency vibrations in the fluid near to the article, the improvement which comprises:

sound detection augmentation means positioned out of contact with said article but adjacent to the surface thereof for intercepting the passage of said pressurized fluid through any leakage openings in said article for converting at least a portion of the energy of the leaking fluid into high frequency fluid vibrations to which the detecting means is responsive, thereby augmenting the detection of leakage openings by said high frequency vibration sensitive detecting means.

2. Test apparatus as claimed in claim 1 wherein said sound detection augmentation means comprises a perforate sheet member positioned substantially uniformly from said article's surface.

3. Test apparatus as claimed in claim 2 wherein said sheet member is a screen.

4. A test apparatus as claimed in claim 3 wherein said screen is spaced from said article's surface a distance of approximately one-sixteenth inch to one-eighth inch.

5. Test apparatus as claimed in claim 3 wherein said screen has openings comprising approximately half the surface area of said screen and wherein said screen has a mesh of at least 100.

6. Test apparatus for determining the leak tightness of articles such as container ends, bodies and the like which comprises:

a. walls forming a chamber, said chamber being adapted to be hermetically sealed and having a test opening therein;

b. means for sealingly clamping an article to be tested in a position covering said test opening of said chamber, said article having one surface bounding said chamber and the opposite surface thereof on the exterior of said chamber;

c. pressure means for applying a predetermined differential fluid pressure across said exterior surface of said article to be tested;

d. high frequency vibration sensitive detecting means sensitive to frequencies above 20,000 cycles per second and within said chamber for detecting any high frequency vibrations within said chamber; and e. a sound detection augmentation element positioned between said article and said detecting means and adjacent to the surface of said article and comprising a sheet of material intercepting the passage of pressurized fluid through leakage openings and converting at least a portion of the energy of the leaking fluid into high frequency fluid vibrations to which the detecting means is responsive, thereby to augment the detection of leakage openings by said detecting means.

7. Test apparatus as claimed in claim 6 wherein said sound detection augmentation element is a screen.

8. Test apparatus as claimed in claim 7 wherein said screen is mounted in said chamber.

9. Test apparatus as claimed in claim 7 wherein said screen is supported by a second screen of coarser mesh.

10. Test apparatus as claimed in claim 9 wherein said screen for augmenting detection has openings comprising approximately half of the surface area of said screen, and is spaced approximately one-sixteenth to one-eighth inch from said article.

11. A method for determining the leak tightness of container ends, bodies and the like, comprising:

a. positioning the article out of contact with but adjacent to a sheet of sound detection augmentation material for intercepting the passage of pressurized fluid through leakage openings in said article and for converting at least a portion of the energy of the leaking fluid into fluid vibrations;

b. applying a predetermined differential fluid pressure across said article to be tested, said pressure difference being arranged to cause fluid to flow through leaks to be intercepted by said sound detection augmentation material; and c. detecting the fluid vibrations produced by the passage of fluid through any leakage openings in the article and being intercepted by said sound detection augmentation material.

12. A method as claimed in claim 11 wherein said article is positioned at a distance of approximately one-sixteenth inch to one-eighth inch from said sound detection augmentation material.

* * * * *